(12) United States Patent
Bruhn et al.

(10) Patent No.: US 11,002,226 B2
(45) Date of Patent: May 11, 2021

(54) WATER TANK DEVICE FOR AN INTERNAL COMBUSTION ENGINE WITH WATER INJECTION

(71) Applicant: Bayerische Motoren Werke Aktiengesellschaft, Munich (DE)

(72) Inventors: Andreas Bruhn, Puchheim (DE); Attila Farkas, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/594,305

(22) Filed: Oct. 7, 2019

(65) Prior Publication Data

US 2020/0032745 A1 Jan. 30, 2020

Related U.S. Application Data

(63) Continuation of application No. PCT/EP2018/057845, filed on Mar. 28, 2018.

(30) Foreign Application Priority Data

Apr. 11, 2017 (DE) .................... 10 2017 206 251.7

(51) Int. Cl.
  *F02M 25/022* (2006.01)
  *B60K 15/03* (2006.01)
  *F02M 25/03* (2006.01)

(52) U.S. Cl.
  CPC ......... *F02M 25/0222* (2013.01); *B60K 15/03* (2013.01); *F02M 25/03* (2013.01); *B60K 2015/03236* (2013.01)

(58) Field of Classification Search
  USPC ....................................... 123/509, 516, 518
  See application file for complete search history.

(56) References Cited

U.S. PATENT DOCUMENTS 3,734,293 A * 5/1973 Biskis .................... F25B 21/04
                                                      210/185
4,031,864 A * 6/1977 Crothers ............ F02M 25/0228
                                                      123/1 A
(Continued)

FOREIGN PATENT DOCUMENTS

CN         1896487 A     1/2007
CN       104508289 A     4/2015
(Continued)

OTHER PUBLICATIONS

International Search Report (PCT/ISA/210) issued in PCT Application No. PCT/EP2018/057845 dated May 29, 2018 with English translation (six (6) pages).

(Continued)

*Primary Examiner* — Sizo B Vilakazi
*Assistant Examiner* — Brian R Kirby
(74) *Attorney, Agent, or Firm* — Crowell & Moring LLP

(57) ABSTRACT

A water tank device for an internal combustion engine with water injection, includes a water tank with an internal volume, which is at least partly delimited by a tank wall and in which a liquid is stored for the water injection in the internal combustion engine, and a filter device, which is designed to clean fuel vapor from a fuel tank of the internal combustion engine. The filter device has a heat transfer surface. The filter device is closed so as to be fluid-tight against the liquid which can be received in the internal volume. The filter device is arranged on the water tank such that a heat exchange with the liquid which can be stored in the water tank is facilitated via the heat transfer surface.

8 Claims, 2 Drawing Sheets

(56) References Cited

U.S. PATENT DOCUMENTS

| | | | | |
|---|---|---|---|---|
| 4,385,615 A * | 5/1983 | Keane | F02D 19/0647 | 123/514 |
| 4,409,950 A * | 10/1983 | Goldberg | F01M 13/022 | 123/572 |
| 4,541,367 A * | 9/1985 | Lindberg | F02B 43/08 | 123/25 M |
| 4,732,588 A * | 3/1988 | Covert | F02M 25/0854 | 96/144 |
| 4,793,839 A * | 12/1988 | Hayashida | B60K 15/03504 | 123/519 |
| 4,852,761 A * | 8/1989 | Turner | B60K 15/03504 | 220/746 |
| 4,919,103 A * | 4/1990 | Ishiguro | B60K 15/03504 | 123/509 |
| 5,054,453 A * | 10/1991 | Onufer | B60K 15/03504 | 123/516 |
| 5,060,620 A * | 10/1991 | Oslapas | F02M 25/0854 | 123/519 |
| 5,111,900 A * | 5/1992 | Leitermann | F02M 25/0854 | 123/519 |
| 5,148,776 A * | 9/1992 | Connor | F02D 19/12 | 123/25 J |
| 5,251,603 A * | 10/1993 | Watanabe | F02M 31/20 | 123/541 |
| 5,255,735 A * | 10/1993 | Raghava | F02M 25/089 | 165/111 |
| 5,337,721 A * | 8/1994 | Kasuya | F02M 25/0854 | 123/519 |
| 5,386,811 A * | 2/1995 | Rochette | B60K 15/03504 | 123/519 |
| 5,409,264 A * | 4/1995 | Nakatani | B60K 15/03504 | 280/784 |
| 5,522,425 A * | 6/1996 | Kroiss | F02M 37/106 | 123/514 |
| 5,592,922 A * | 1/1997 | Denz | B60K 15/03504 | 123/520 |
| 5,647,331 A * | 7/1997 | Swanson | F02M 37/10 | 123/509 |
| 5,702,125 A * | 12/1997 | Nakajima | B60K 15/03504 | 280/834 |
| 5,743,943 A * | 4/1998 | Maeda | B01D 53/0415 | 123/519 |
| 5,868,428 A * | 2/1999 | Ishikawa | B60K 15/03504 | 123/519 |
| 5,901,689 A * | 5/1999 | Kimura | B60K 15/03504 | 123/518 |
| 5,931,141 A * | 8/1999 | Chino | B60K 15/035 | 123/516 |
| 6,067,967 A * | 5/2000 | Kidokoro | F02D 33/003 | 123/514 |
| 6,273,070 B1 * | 8/2001 | Arnal | B60K 15/03504 | 123/519 |
| 6,279,548 B1 * | 8/2001 | Reddy | B01D 53/02 | 123/519 |
| 6,289,853 B1 * | 9/2001 | Walczak | F02B 61/045 | 123/25 R |
| 6,422,207 B1 * | 7/2002 | Kolb | F02M 31/20 | 123/461 |
| 6,439,205 B2 * | 8/2002 | Ushigome | F02M 37/106 | 123/509 |
| 6,689,196 B2 * | 2/2004 | Amano | F02M 31/125 | 96/112 |
| 6,857,419 B1 * | 2/2005 | Harvey | F28D 7/024 | 123/509 |
| 6,892,711 B2 * | 5/2005 | Belanger, Jr. | F02M 25/0809 | 123/516 |
| 6,964,264 B2 * | 11/2005 | Yoshioka | B01D 35/26 | 123/509 |
| 7,047,948 B2 * | 5/2006 | Gerhardt | B60K 15/03504 | 123/516 |
| 7,086,389 B2 * | 8/2006 | Yamada | F02M 1/10 | 123/516 |
| 7,100,580 B2 * | 9/2006 | Lin | F02M 25/0854 | 123/516 |
| 7,143,750 B2 * | 12/2006 | Brunel | B60K 15/03504 | 123/509 |
| 7,159,568 B1 * | 1/2007 | Lewis | F02D 19/0692 | 123/431 |
| 7,225,799 B2 * | 6/2007 | Wang | F02M 25/0836 | 123/518 |
| 7,383,825 B2 * | 6/2008 | Mills | B60K 15/03 | 123/516 |
| 7,389,751 B2 * | 6/2008 | Leone | F02D 19/084 | 123/1 A |
| 8,042,525 B2 * | 10/2011 | Kobayashi | F02M 25/0836 | 123/521 |
| 9,050,885 B1 * | 6/2015 | Dudar | B60K 11/085 | |
| 9,334,837 B2 * | 5/2016 | Chung | H01L 35/30 | |
| 9,353,709 B2 * | 5/2016 | Aso | F02D 41/3082 | |
| 9,776,624 B1 * | 10/2017 | Leone | B60K 6/40 | |
| 10,337,462 B2 * | 7/2019 | Yang | F02M 25/0809 | |
| 2002/0074059 A1 * | 6/2002 | Schaefer | B60K 15/03519 | 141/325 |
| 2004/0231648 A1 * | 11/2004 | Katayama | F02M 25/089 | 123/541 |
| 2006/0010857 A1 * | 1/2006 | Hu | F01N 3/035 | 60/286 |
| 2006/0107932 A1 * | 5/2006 | Shibata | F02D 41/3082 | 123/516 |
| 2006/0196480 A1 * | 9/2006 | Kosugi | F02M 25/0854 | 123/516 |
| 2007/0012299 A1 | 1/2007 | Wang et al. | | |
| 2008/0228382 A1 * | 9/2008 | Lewis | F02D 19/0692 | 701/111 |
| 2010/0032436 A1 * | 2/2010 | Gebert | B60K 15/04 | 220/601 |
| 2010/0121559 A1 * | 5/2010 | Bromberg | F02D 19/084 | 701/111 |
| 2011/0168025 A1 * | 7/2011 | Huynh | F02M 25/0854 | 96/126 |
| 2011/0168138 A1 * | 7/2011 | Achor | F02M 37/08 | 123/516 |
| 2011/0297127 A1 * | 12/2011 | Aso | F02M 25/089 | 123/519 |
| 2012/0312281 A1 * | 12/2012 | Tsutsumi | F02M 25/089 | 123/519 |
| 2013/0133629 A1 * | 5/2013 | Ogita | F02M 25/08 | 123/519 |
| 2014/0331951 A1 * | 11/2014 | Bidner | F02M 21/0215 | 123/1 A |
| 2015/0114370 A1 * | 4/2015 | Leone | F02D 41/0025 | 123/575 |
| 2015/0219045 A1 | 8/2015 | Aso | | |
| 2018/0079281 A1 * | 3/2018 | Leone | B60H 1/32331 | |

FOREIGN PATENT DOCUMENTS

| | | | |
|---|---|---|---|
| CN | 205638598 U | 10/2016 | |
| CN | 206111378 U | 4/2017 | |
| DE | 10 2007 048 724 A1 | 4/2009 | |
| DE | 10 2015 208 480 A1 | 11/2016 | |
| EP | 2 881 573 A1 | 6/2015 | |
| FR | 2997130 A1 * | 4/2014 | F02M 25/0854 |
| JP | 53-131122 U | 10/1978 | |
| JP | 63198768 A * | 8/1988 | |
| JP | 10089163 A * | 4/1998 | |
| JP | 2009-97355 A | 5/2009 | |
| JP | 2014-37796 A | 2/2014 | |
| WO | WO 2016/177557 A1 | 11/2016 | |

OTHER PUBLICATIONS

German-language Written Opinion (PCT/ISA/237) issued in PCT Application No. PCT/EP2018/057845 dated May 29, 2018 (five (5) pages).

German-language Office Action issued in counterpart German Application No. 102017206251.7 dated Dec. 14, 2017 (three (3) pages).

(56) References Cited

OTHER PUBLICATIONS

English-language Chinese Office Action issued in Chinese application No. 201880012046.1 dated Nov. 27, 2020 (Nine (9) pages).

\* cited by examiner

WATER TANK DEVICE FOR AN INTERNAL COMBUSTION ENGINE WITH WATER INJECTION

CROSS REFERENCE TO RELATED APPLICATIONS

This application is a continuation of PCT International Application No. PCT/EP2018/057845, filed Mar. 28, 2018, which claims priority under 35 U.S.C. § 119 from German Patent Application No. 10 2017 206 251.7, filed Apr. 11, 2017, the entire disclosures of which are herein expressly incorporated by reference.

BACKGROUND AND SUMMARY OF THE INVENTION

The invention relates to a water tank device for an internal combustion engine with water injection and to a fuel supply system. A water tank device is known from the prior art and, in particular, from DE 10 2015 208480 A1.

In the following text, the invention will be described using a water injection system for an internal combustion engine which is configured in a reciprocating piston design and can be operated in accordance with the Otto principle; this is not to be understood to be a restriction of the invention.

It has been known for a long time to introduce water into the combustion chambers of a reciprocating piston engine, in order to increase the power output and/or to lower the consumption as a result. Here, the components which are necessary for the water injection system are additional components which cause an additional installation space requirement in the motor vehicle; therefore, it is necessary for a system of this type to be of as compact a configuration as possible, in relation to the overall design.

DE 10 2015 208480 A1 discloses a water injection system for an internal combustion engine having a water tank and a filter which is arranged in the water tank.

It is an object of the invention to provide a water tank device and a fuel supply system having a water tank of this type, which have a compact overall design. This object is achieved by way of a water tank device and by way of a fuel supply system in accordance with the claimed invention.

Within the context of the invention, a water tank device is to be understood to mean a device for receiving water which is provided for introduction into at least one combustion chamber of an internal combustion engine. Within the context of the invention, an internal combustion engine is to be understood to mean a thermal engine with internal combustion, in particular of reciprocating piston design, it preferably being possible for said internal combustion engine to be operated in accordance with the Otto principle.

The water tank device has a water tank with an internal volume for receiving water or another liquid, said internal volume being delimited at least in sections, or preferably completely, by way of a tank wall. The liquid, in particular the water, can be stored, in particular, in said internal volume, with the result that the water tank represents, in particular, a container for receiving a liquid.

Furthermore, the water tank device has a filter device. The filter device is set up, in particular, for purifying fuel vapor or fuel gases from a fuel tank of the internal combustion engine. A fuel, preferably gasoline, is used, in particular, for operating an internal combustion engine which can be operated in accordance with the Otto principle, said fuel releasing vapor or gases under environmental conditions which are discharged to the environment. In order, in particular, to keep the environmental pollution low, the filter device is provided, through which said vapor or said gases flows/flow before it passes/they pass into the environment.

The filter device has, in particular, a filter element, through which the abovementioned vapor or gas can flow before its exit to the environment, and said filter device has, furthermore, a filter housing with a heat transfer surface. A heat exchange with the environment which surrounds the filter device is made possible via the heat transfer surface. In particular, the heat transfer surface is to be understood to mean a surface region of the filter device, preferably a surface region of the filter housing.

The filter device or, more precisely, the filter element is closed off in a fluid-tight manner, in particular by way of the filter housing, with respect to the water which can be stored in the internal volume of the water tank. By way of this configuration of the filter device, in particular, no water can pass from the water tank into the filter device and therefore also cannot enter into the filter element.

The filter device is preferably arranged on the water tank in such a way that an exchange of heat with the water which can be stored in the water tank is made possible via the heat transfer surface. The filter device is preferably arranged completely outside or with preference partially outside the internal volume of the water tank, and the filter device is further preferably arranged completely inside or with preference partially inside the internal volume. An exchange of heat via the heat transfer surface is made possible, in particular, when the filter device is arranged in the immediate vicinity of the water tank or preferably at least partially or completely inside the internal volume.

In this context, the immediate vicinity is preferably to be understood to mean that, for the case where the filter device is arranged outside the internal volume, the heat transfer surface is at a minimum spacing of 50 mm or less, preferably 20 mm or less and particularly preferably 10 mm or less from the water tank; the heat transfer surface preferably makes contact with the tank wall or is particularly preferably part of the tank wall. Particularly simple maintenance of the filter device is made possible, in particular, by way of an arrangement of the filter device outside the internal volume. A particularly satisfactory exchange of heat with the water which can be stored in the water tank is made possible, in particular, by means of an arrangement of the filter device (at least partially) inside the internal volume.

In one preferred embodiment of the invention, the filter device is arranged directly on the tank wall, that is to say, in particular, within the abovementioned spacing range, which tank wall delimits the internal volume of the water tank at least partially from the outside. The filter device is preferably arranged in a region of the tank wall, in which region it delimits the internal volume of the water tank.

In one preferred embodiment of the invention, the filter device is arranged (at least partially) inside the internal volume of the water tank. The filter device is preferably arranged completely inside the internal volume. A particularly satisfactory exchange of heat and a compact construction can be achieved, in particular, by means of complete receiving of the filter device into the water tank.

In one preferred embodiment of the invention, the tank wall has a passage region. The filter device is preferably arranged partially inside the internal volume of the water tank and passes in the passage region through the tank wall which delimits the internal volume. A seal device is preferably arranged in the passage region, by way of which seal device the internal volume is closed off in a fluid-tight manner with respect to the environment which surrounds the water tank, in particular in conjunction with the filter device. The seal device preferably has at least one seal lip which makes contact with the filter device. In a further preferred embodiment, the filter device has a union nut, by way of which the filter device is fastened to the tank wall in the passage region. In particular, by means of the described configuration, the filter device is guided via the seal region through the tank wall and, in particular, a part of the filter device protrudes into the internal volume and a part of the filter device is outside the internal volume. The filter device or the filter element can therefore be replaced simply, and particularly simple maintenance of the filter device is thus made possible.

In one preferred embodiment, a first latching section is arranged on the tank wall and a second latching section is arranged on the filter device. The filter device can preferably be connected to the tank wall via the first and second latching section in such a way that the two latching sections together configure a latching connection. The filter device is fastened to the tank wall, in particular, by means of the latching connection, and simple mounting of the filter device on the tank wall can therefore be achieved.

In one preferred embodiment of the invention, the filter device has a filter element; in particular, the filter element has activated carbon as one constituent part or preferably consists of activated carbon. In particular, the filter element is configured as what is known as an activated carbon filter. In particular, activated carbon filters have proven to be particularly effective filters for the present purpose. Heating of the filter element can occur during filtering of the fuel vapor; the heating of the filter element is reduced and the filter action is improved, in particular, by way of the heat discharge/heat transfer into the liquid which can be received in the water tank, in particular water.

Furthermore, a fuel supply system of an internal combustion engine is provided with a water tank in accordance with the above-described design. The fuel supply system has a fuel tank with an internal fuel volume. Fuel for the internal combustion engine can be stored in the internal fuel volume. The fuel is provided for combustion in the internal combustion engine. Furthermore, the fuel supply system has a fuel vapor feed line, by way of which the internal fuel volume can be connected or is connected in a fluid-conducting manner to the filter device. Furthermore, the system has a fuel vapor discharge line, by way of which the filter device can be connected or is connected in a fluid-conducting manner to the environment which surrounds the fuel supply system. In relation to the flow direction from the internal fuel volume into the environment which surrounds the fuel supply system, the filter device is arranged downstream of said internal fuel volume, and the fuel vapor discharge line is arranged downstream of the fuel vapor feed line.

In particular, it is made possible by way of a water tank device of this type and a fuel supply system of this type to achieve a low installation space requirement, and it is made possible, furthermore, in particular if an activated carbon filter is used, to stabilize the latter thermally by way of the liquid which can be stored in the water tank, in particular water. A filter device of this type is heated during filtering, that is to say during loading of the activated carbon filter, and the filter device cools down during cleaning, that is to say in a flushing mode of the filter device. The filter device is stabilized thermally (temperature fluctuations of the filter element are reduced), in particular, by virtue of the fact that an exchange of heat with the liquid which can be stored in the water tank is made possible via the heat transfer surface; said filter device is therefore heated to a less pronounced extent and cools down to a less pronounced extent. The effectiveness of the filter device is therefore improved, in particular, by way of the transfer of heat between the filter device and water which can be stored in the water tank, and fewer emissions are given off to the environment.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
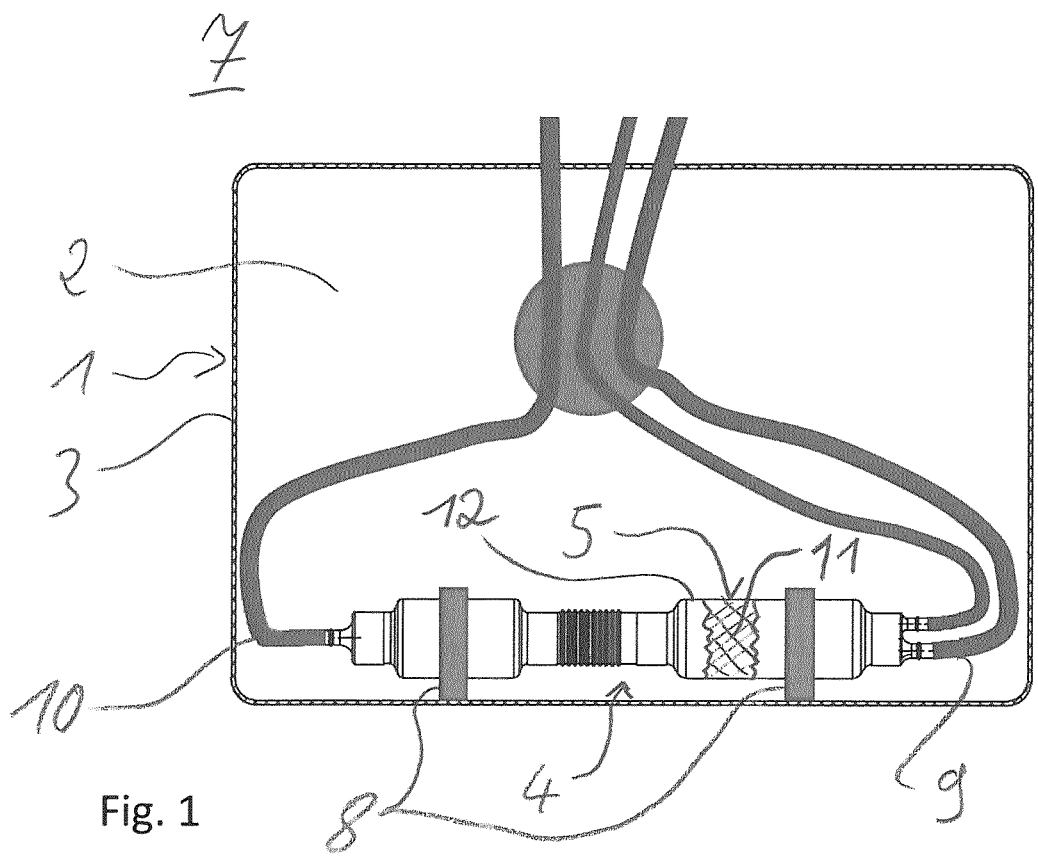
FIG. 1 shows a section through a first embodiment of the water tank device.

FIG. 1 shows a first embodiment of the water tank device having a water tank 1, in the case of which the fuel vapor feed line and discharge line are guided into the water tank 1 through a flange. The filter device 4 is arranged in the internal volume 2 of the water tank 1; said internal volume 2 is delimited by way of the tank wall 3, and water or a mixture on the basis of water for the injection in the internal combustion engine can be received in the internal volume 2.

The outer surface of the filter device 4 forms the heat transfer surface 5. In the region of the filter element 4, the filter device 4 or, more precisely, the filter housing 12, in which the filter element 11 is arranged and on the surface of which the heat transfer surface 5 is arranged, is shown in a cut-away illustration. It can be seen from this type of illustration that the heat transfer surface 5 is arranged at least in the region of the filter element 11, and that a particularly satisfactory transfer of heat is therefore made possible from the filter element 11 by the heat transfer surface 5 into the water which can be stored in the water tank 1.

The filter device 4 is arranged completely in the internal volume 2 of the water tank 1, and is held on the water tank 1 on the tank wall 3 by way of the latching connections 8.

The filter device 4 is connected in a fluid-conducting manner to a fuel tank via the fuel vapor feed line 9, with the result that fuel vapor can be fed to the filter element 11 and is purified by way of the latter during passage through it. When the fuel vapor has passed through the filter element 11 and is purified, it passes through the fuel vapor discharge line 10 into the environment 7 which surrounds the water tank 1.

Figure 2:
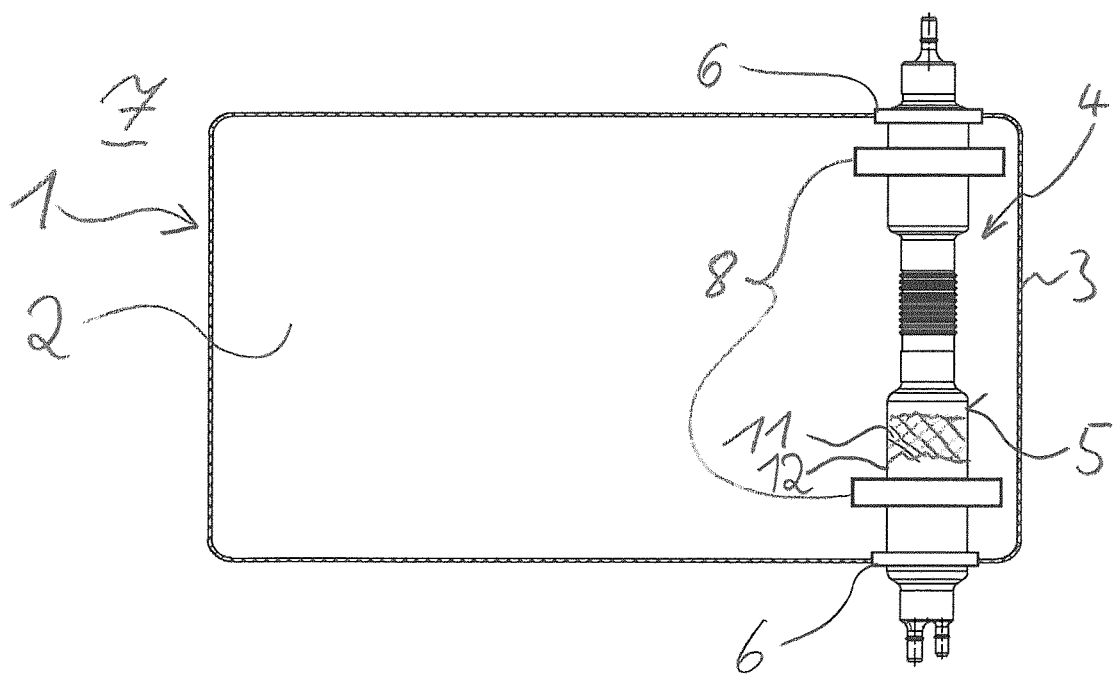
FIG. 2 shows a section through a further embodiment of the water tank device.

FIG. 2 shows a further embodiment of the water tank device; in the following text, the differences from the embodiment which is shown in FIG. 1 will be substantially described.

In the two passage regions 6, the filter device 4 passes through the tank wall 3 of the water tank 1 from the internal volume 2 to the outside into the environment 7 which surrounds the water tank 1. In each case one seal device is arranged in the passage regions 6, with the result that no liquid can exit from the internal volume 2 through the passage regions 6. The filter device 4 is held on the tank wall 3 via the latching connections 8. In the case of a configuration of this type, simple maintenance of the filter device is made possible, since the fuel vapor feed line and discharge line 9, 10 can be connected simply to the filter device, and the filter device 4 can be removed from the water tank 1 for maintenance.

Figure 3:
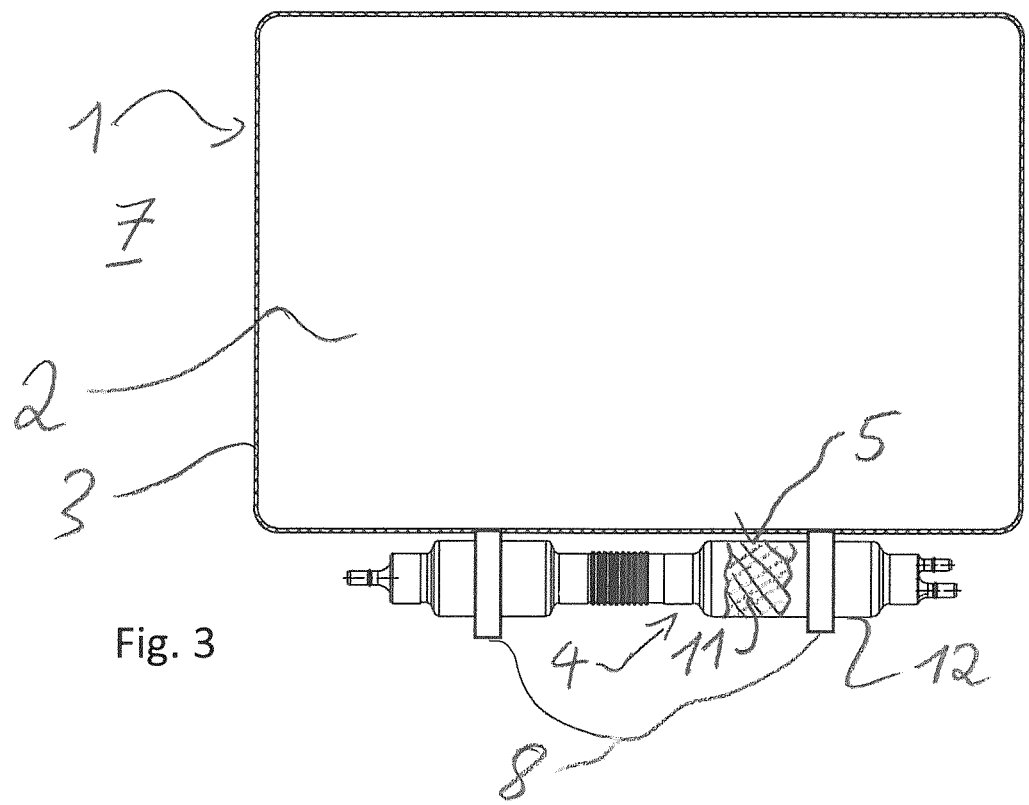
FIG. 3 shows a section through a further embodiment of the water tank device.

FIG. 3 shows a further embodiment of the water tank device; in the following text, substantially the differences from the embodiments which are shown in FIG. 1 and FIG. 2 will be described.

The filter device 4 is arranged on the tank wall 3 of the water tank 1 from the outside, and an exchange of heat with the liquid which can be stored in the internal volume 2 of the water tank 1 is made possible via the heat transfer surface 5. The filter device 4 is held on the tank wall 3 via the latching connections 8. In the case of a configuration of this type, the maintenance of the filter device 4 is simplified further. In addition, the filter device can be secured against inadvertent slipping with respect to the water tank 1 by way of one or more union nuts (not shown).

Figure 4:
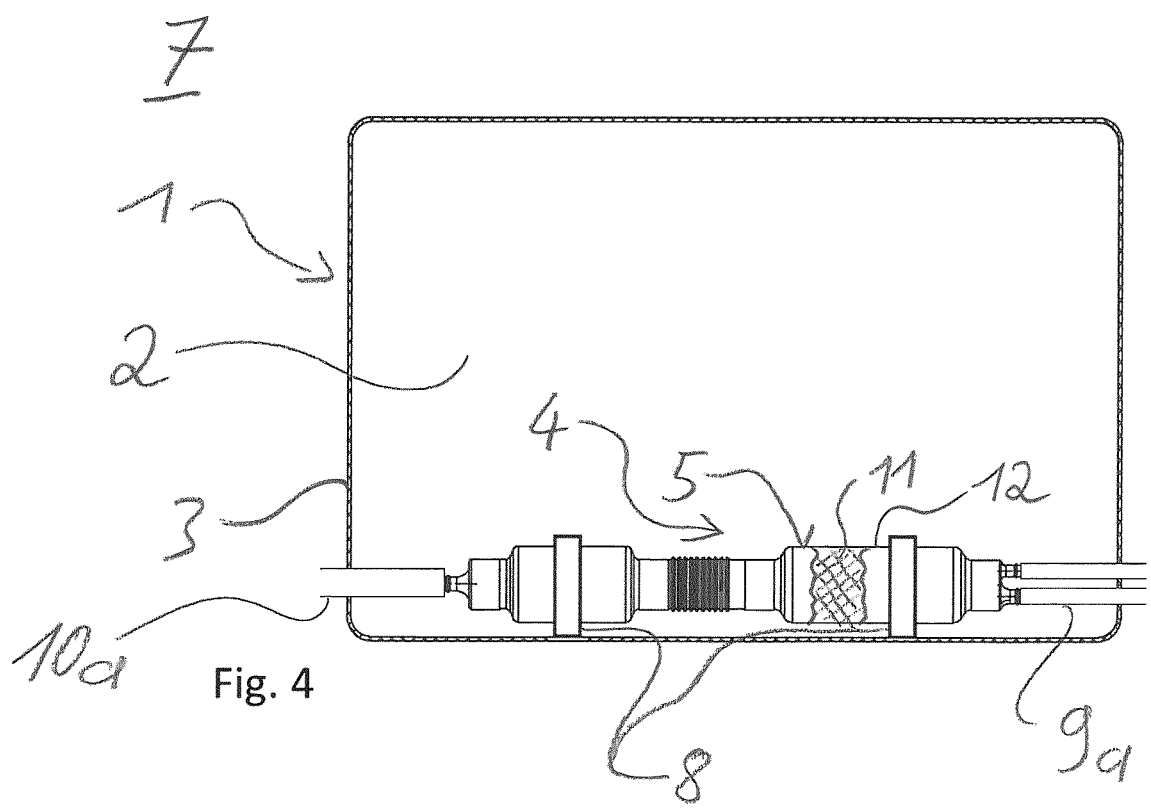
FIG. 4 shows a section through a further embodiment of the water tank device.

FIG. 4 shows a further embodiment of the water tank device; in the following text, substantially the differences from the embodiments which are shown in FIGS. 1 to 3 will be described.

The filter device 4 is arranged completely in the internal volume 2 of the water tank 1. The fuel vapor feed and discharge line are formed via the corrugated pipes 9a and 10a. The corrugated pipes 9a, 10a can be connected in one piece to the tank wall 3 and/or to the filter device 4. The tank wall 3 and the corrugated pipe or pipes 9a, 10a and/or the filter device 4 and the corrugated pipe or pipes 9a, 10a can preferably be configured as a two-component injection molded part. At least one of the corrugated pipes 9a, 10a is further preferably welded to the tank wall 3 or to the filter device 4, or is overmolded with plastic during the production method of the tank wall 3 or the filter device 4 and is thus connected to the latter in an integrally joined manner. Production methods of this type are known from the prior art for plastic components.

LIST OF DESIGNATIONS

1 Water tank
2 Internal volume
3 Tank wall
4 Filter device
5 Heat transfer surface
6 Passage region through the tank wall
7 Environment surrounding the water tank
8 Latching connection
9 Fuel vapor feed line
9a Corrugated pipe for the fuel vapor feed line
10 Fuel vapor discharge line
10a Corrugated pipe for the fuel vapor discharge line
11 Filter element
12 Filter housing The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A water tank device of an internal combustion engine with water injection, comprising:
    a water tank with an internal volume in which water for the water injection in the internal combustion engine is stored; and
    a filter device which is configured to purify fuel vapor from a fuel tank of the internal combustion engine, the filter device having a heat transfer surface, wherein
    the filter device is closed off in a fluid-tight manner with respect to the water which is stored in the internal volume, and
    the filter device is arranged on the water tank such that an exchange of heat with the water which is stored in the water tank is made possible via the heat transfer surface.

2. The water tank device according to claim 1, wherein the filter device is arranged directly on a tank wall of the water tank from outside and therefore outside the internal volume.

3. The water tank device according to claim 1, wherein the filter device is arranged at least in sections inside the internal volume.

4. The water tank device according to claim 3, wherein a tank wall of the water tank has a seal device in a passage region, in which the filter device enters through the tank wall into the internal volume, by way of which seal device the internal volume is closed off in a fluid-tight manner with respect to the environment which surrounds the water tank.

5. The water tank device according to claim 4, wherein the filter device has a union nut, by way of which the filter device is fastened to the tank wall in the passage region.

6. The water tank device according to claim 1, wherein a first latching section is arranged on a tank wall of the water tank,
    a second latching section is configured on the filter device, and
    the two latching sections together configure a latching connection, by way of which the filter device is fastenable to the tank wall.

7. The water tank device according to claim 1, wherein the filter device has a filter element for purifying fuel vapor, and
    the filter element has an activated carbon filter at least partially as one constituent part.

8. A fuel supply system of an internal combustion engine with water injection, comprising:
    the water tank device according to claim 1;
    a fuel tank with an internal fuel volume, in which fuel for said internal combustion engine is storable,
    a fuel vapor feed line which connects the internal fuel volume in a fluid-conducting manner to the filter device, and
    a fuel vapor discharge line which connects the filter device to the environment which surrounds the water tank.

* * * * *